United States Patent Office 3,700,423
Patented Oct. 24, 1972

3,700,423
METHOD OF MAKING A LENS BALANCED LASER ROD AND ROD PRODUCED THEREBY
Joseph W. Kantorski, Southbridge, Mass., assignor to American Optical Corporation, Southbridge, Mass.
No Drawing. Filed Apr. 28, 1969, Ser. No. 819,992
Int. Cl. C03c 15/00; C03b 21/00; H01s 3/00
U.S. Cl. 65—30                                    6 Claims

ABSTRACT OF THE DISCLOSURE

A laser rod, having a length to lateral dimension ratio of at least about 1 to 1 or greater, is formed of an unannealed glass having an active laser ingredient, and the rod, made to desired dimensions, during its manufacture is cooled in such a manner that there is a gradient of strain from the surface to the center and between the ends, producing a zero lens effect at high repetition rates where the resonant optical energy produces high temperatures in the rod. The rod is produced with a negative lens effect, at least at sections intermediate the opposed ends, which is substantially equal to the positive lens effect produced by expansion of the rod due to the heating derived from optical pumping, taking into consideration the differential cooling effect from the exterior surface inwardly of the rod.

---

A laser is a mechanism for producing a high energy beam of coordinated light, usually in a very narrow range of wave lengths. One form of device usually emits the high energy beam as a discontinuous beam, that is a short emulsion period following a build up period to increase the population of high energy level atoms in the laser material (usually a rod) of the device. Another form emits an essentially continuous beam for various periods of time. Very high levels of energy are achieved in either form of the device, and a considerable amount of heat is produced in the laser rod of the unit. Various means have been proposed to dissipate the heat, but the construction of the unit requires that it have a laser material which is a rod-like mass, usually at a length to lateral dimension ratio of about 1 to 1 or greater. The structure of the laser material itself, which is a glass-like material, does not permit efficient removal of heat particularly from the internal portions of the laser rod.

Within the present application, a laser glass is defined as a glass embodying an active laser ingredient selected from the group including Praseodymium+++, Neodymium+++, Samarium++, Samarium+++, Europium++, Europium+++, Uranium+++, Terbium+++, Holmium+++, Erbium+++, Thulium+++, Dysprosium+++, Ytterbium+++, and Cerium+++.

It is sometimes desirable to operate a laser at high peak power outputs continuously or at repetitive rates of one pulse per second or faster. Under these conditions, the center of the laser rod or rods in a laser cavity will be at a higher temperature than the external surface resulting in a thermal gradient causing differential expansion which produces a positive lens effect in the laser rod. That is, the rod will exhibit properties common to positive lenses and will, therefore, focus or channel laser energy toward the center of the rod. This effect increases beam divergence, reduces the output of the laser cavity and produces high energy densities in the center of the laser rod. In the case of a Q-switched laser rod, high power densities result, and microscopic platinum or other inclusions cause catastrophic failure of the laser rods.

According to the present invention there is produced a rod for a laser unit, having a 1 to 1 or greater ratio of length to diameter, formed of a glass having an active laser ingredient included. The glass is initially formed by fusing a mixture of the desired ingredients, and then casting to form a billet or other crude shapes. The crude shape is then reheated to a temperature sufficient for drawing purposes, the rod configuration is then drawn down to size and cut to the desired length. The cut rods are then cooled without annealing in any respect. In some instances, it may be desirable to provide additional cooling during the drawing whereby a strain gradient from the center of the rod outwardly toward the sides is effected. The greatest strain in, and the rod being at the outer surface, building into the rod a lensing effect intermediate its opposite ends. The formed laser rods are normally cooled in air, so that the outer surface of the rod starts to cool first, and continues to cool while the interior thereof is at a higher temperature. This results in contraction so that the outer surface is in compression and the inner portions in tension. Sufficient strain is produced within the glass from its outer side wall surface portions inwardly, at least at sections intermediate the opposite ends thereof, such that a negative lensing effect, in the cool rod, is produced when the rod is used in the resonant laser cavity which is just equal to and opposite in algebraic sign to the lens power effect unavoidably introduced into the rod by the reason of optical pumping. The optical pumping during laser operation uniformly heats the entire volume of the laser, but due to the construction of the laser assembly, the surface areas cool more rapidly than the interior.

In the preparation of laser rods according to the invention, preferably the batch of laser glass should not contain compounds of noble or transition metals. Normally, the laser glass must contain fining agents which are salts of alkali or alkaline earth metals to prevent bubbling in the glass. In one form, the laser glass contains from 40 to 90 weight percent of silicon dioxide and a metallic oxide which produces the lasering effect, which includes chromium, neodymium, the other rare earth metals, and the like. The ingredients of the glass batch are thoroughly mixed and melted in a ceramic crucible. The glass is then shaped by casting, extruding, pressing or drawing into crude form such as a billet or the like. The crude form is then heated to drawing temperature and the form is drawn down. The drawn rod is then cut to size. The hot laser rods are then air cooled to cause strains from the surface inwardly to the center of the rod. After cooling and while the rod is still under strain, the ends are polished and made essentially parallel without subsequent heating. The ends are then mirrored for laser use, where one end, for example, is mirrored to 100% reflection while the opposite end is mirrored to produce 2% transmission. The rod is then placed in a laser cavity, and the optical jumping heats the rod. On heating, however, the negative lens effect of the cool rod, due to the strains in the rod, changes overcoming the positive effective of expansion of the glass. The rod differentially expands, thereby, counteracting the differential contraction effectively producing a zero power lens in the rod during use. By calculation, a negative lens effect may be produced to just counteract the positive lens effect of the expansion of the glass due to the heat produced by the optical pumping. The cooling is performed in air, and where more rapid cooling is desired, to produce a greater strain, chilled air may be passed over the rod.

EXAMPLE

A neodymium glass was made according to the teachings of application No. 168,012 of Elias Snitzer filed Jan. 16, 1962 (and the subject matter thereof is incorporated herein by reference) and owned by the same assignee as the instant case and including about 5% Nd+++. A rod was made from the glass and had the following dimensions: length 21½ inches, diameter ¼ inch. The rod was at 1380° F. during drawing. It was allowed to cool to room temperature which was about 70° F. The cooling took place in about two hours. The rod subsequently had its ends polished in a conventional manner. The rod was subjected to tests which substantiated that a negative lens effect had been obtained. The negative lens power was −8 (minus eight) diopters. This proved sufficient to overcome the positive lens effect induced upon pumping.

Having thus described the invention in detail and with sufficient particularity as to enable those skilled in the art to practice it, what is desired to have protected by Letters Patent is set forth in the following claims.

What is claimed is;

1. A method for forming a laser rod having a balanced lensing effect at operating conditions of high repetitive or continuous rates, the method comprising the following steps performed in the order shown:
   (a) Heating a laser glass mass to drawing temperature, said laser glass being a glass mass embodying an active laser ingredient selected from the group including Prasedoymium$^{+++}$, Neodymium$^{+++}$, Samarium$^{++}$, Samarium$^{+++}$, Europium$^{++}$, Europium$^{+++}$, Uranium$^{+++}$, Terbium$^{+++}$, Holmium$^{+++}$, Erbium$^{+++}$, Thulium$^{+++}$, Dysprosium$^{+++}$, Ytterbium$^{+++}$, and Cerium$^{+++}$.
   (b) drawing said mass to a rod configuration;
   (c) cutting said rod configuration into at least one length of laser rod having a length to diameter ratio at least about 1:1; and
   (d) cooling radially said at least one length at a rate greater than maximum rate to anneal and sufficient to produce a radial strain gradient and a concomitant axial optical transmission negative lensing effect, in at least one length, said gradient being from the surface to the center thereof, and said axial negative lensing effect being essentially equal to and opposite the positive lensing effect produced axially in said at least one length at high repetitive or continuous rates of laser operation.

2. A method for forming a laser rod according to claim 1 the active laser ingredient in the glass mass being Neodymium$^{+++}$.

3. A method according to claim 1 which is further characterized by polishing and reflective coating the ends of said at least one length for laser use.

4. A method according to claim 1 wherein said cooling is conducted in air.

5. A method according to claim 1 wherein said cooling is conducted in chilled air.

6. A laser rod having a balancing lensing effect made according to claim 1.

References Cited
UNITED STATES PATENTS 3,574,045   4/1971   Mould _____ 65—114 X FRANK W. MIGA, Primary Examiner U.S. Cl. X.R.

65—111, 112, 114, 115, LR DIG 7, PS DIG 2; 331—94.5; 350—175 GN